(12) United States Patent
Park

(10) Patent No.: US 10,316,767 B2
(45) Date of Patent: Jun. 11, 2019

(54) METHOD FOR DIAGNOSING STICKING IN CYLINDER DEACTIVATION APPARATUS

(71) Applicant: HYUNDAI KEFICO CORPORATION, Gyeonggi-do (KR)

(72) Inventor: Eun Sang Park, Incheon (KR)

(73) Assignee: HYUNDAI KEFICO CORPORATION (KR)

( * ) Notice: Subject to any disclaimer, the term of this patent is extended or adjusted under 35 U.S.C. 154(b) by 299 days.

(21) Appl. No.: 15/036,986

(22) PCT Filed: Nov. 17, 2014

(86) PCT No.: PCT/KR2014/011027
§ 371 (c)(1),
(2) Date: May 16, 2016

(87) PCT Pub. No.: WO2015/072798
PCT Pub. Date: May 21, 2015

(65) Prior Publication Data
US 2016/0290246 A1    Oct. 6, 2016

(30) Foreign Application Priority Data
Nov. 15, 2013 (KR) .......................... 10-2013-0139096

(51) Int. Cl.
*F02D 41/22* (2006.01)
*F02D 45/00* (2006.01)
(Continued)

(52) U.S. Cl.
CPC .............. *F02D 17/02* (2013.01); *F02D 13/06* (2013.01); *F02D 41/1454* (2013.01);
(Continued)

(58) Field of Classification Search
None
See application file for complete search history.

(56) References Cited

U.S. PATENT DOCUMENTS 3,581,723 A * 6/1971 Scholl .................... F02D 41/10
                                                        123/382
6,934,610 B2 * 8/2005 Wakashiro ............... B60K 6/48
                                                        701/22
(Continued)

FOREIGN PATENT DOCUMENTS

DE        10324805 A1 * 12/2004 ................ F01L 9/02
JP      2002-221055 A     8/2002
(Continued)

OTHER PUBLICATIONS

International Search Report for Application No. PCT/KR2014/011027 dated Dec. 18, 2014.

*Primary Examiner* — Leslie J Evanisko
*Assistant Examiner* — Ruben C Parco, Jr.
(74) *Attorney, Agent, or Firm* — Tarolli, Sundheim, Covell & Tummino LLP

(57) ABSTRACT

The present invention relates to a method for diagnosing sticking in a cylinder deactivation apparatus, the method comprising: an intake valve sticking determining step of determining whether the intake valve is stuck closed or stuck open by detecting the amount of variation of intake pressure in each intake manifold cylinders in an operation-off mode of the cylinder deactivation apparatus and comparing the amount of variation with a predetermined value; and an exhaust valve sticking determining step of determining whether the exhaust valve is stuck closed or stuck open by detecting the state of the air-fuel ratio in exhaust gas if it is determined whether the intake valve is stuck closed or stuck open in the intake valve sticking determining step, thereby sensing the stuck closed or the stuck open state of the intake valve and the exhaust valve so as to diagnose failure of the cylinder deactivation apparatus.

8 Claims, 3 Drawing Sheets

(51) Int. Cl.
*F02D 17/02* (2006.01)
*G01M 15/10* (2006.01)
*G01M 15/11* (2006.01)
*F02D 13/06* (2006.01)
*F02D 41/14* (2006.01)
*F02D 41/00* (2006.01)

(52) U.S. Cl.
CPC ......... *F02D 41/221* (2013.01); *G01M 15/104* (2013.01); *G01M 15/11* (2013.01); *F02D 2041/0012* (2013.01); *F02D 2200/0406* (2013.01); *F02D 2200/1015* (2013.01); *Y02T 10/18* (2013.01); *Y02T 10/40* (2013.01)

(56) References Cited

U.S. PATENT DOCUMENTS

| | | | | |
|---|---|---|---|---|
| 7,785,230 | B2 * | 8/2010 | Gibson | B60W 30/20 477/101 |
| 8,413,421 | B2 * | 4/2013 | Fujimoto | F01N 11/007 60/276 |
| 2002/0026789 | A1 * | 3/2002 | Morinaga | F01N 3/0842 60/277 |
| 2002/0099495 | A1 * | 7/2002 | Takagi | F01L 1/46 701/114 |
| 2003/0110845 | A1 * | 6/2003 | Kumagai | F02D 13/06 73/114.05 |
| 2012/0173122 | A1 * | 7/2012 | Nishikiori | F02D 9/06 701/103 |
| 2013/0231843 | A1 * | 9/2013 | Nakagawa | F02D 41/221 701/102 |
| 2013/0255606 | A1 * | 10/2013 | Nishikiori | F02D 13/08 123/90.1 |

FOREIGN PATENT DOCUMENTS

| | | |
|---|---|---|
| JP | 2006-132385 A | 5/2006 |
| KR | 10-0614188 B1 | 8/2006 |
| KR | 10-2009-0126619 A | 12/2009 |

\* cited by examiner

METHOD FOR DIAGNOSING STICKING IN CYLINDER DEACTIVATION APPARATUS

TECHNICAL FIELD

Exemplary embodiments of the present invention relate to a method for diagnosing sticking in a cylinder deactivation apparatus, and more particularly, to a method for diagnosing sticking in a cylinder deactivation apparatus capable of sensing a stuck closed state or a stuck open state of an intake valve and an exhaust valve due to a failure of the cylinder deactivation apparatus.

BACKGROUND ART

Generally, a cylinder deactivation apparatus, that is, a CDA apparatus is an apparatus deactivating some of all cylinders upon braking or a cruise control and stops a supply of fuel to the cylinders that is a deactivation object and an operation of intake/exhaust valves while the CDA is operated.

In the case of a multi cylinder engine such as 6 cylinders and 8 cylinders, when all combustion chambers are operated under a low load condition over a predetermined vehicle speed or an idle condition in which required power is low to generate power, extra power is generated, and therefore, by using the CDA apparatus, an operation of some of the combustion chambers is stopped (deactivated) and the rest of combustion chambers are controlled to be normally combusted, thereby promoting improvement in fuel efficiency to an optimal torque required for driving.

Fuel is not injected well in the combustion chamber stopped (deactivated) by the CDA apparatus, such that fuel consumption may be reduced, and a power loss due to a friction does not occur in the stopped cylinder, such that a considerable level of fuel efficiency may be obtained.

The CDA apparatus simultaneously opens and closes an intake valve and an exhaust valve on the basis of one cylinder. Here, when the CDA apparatus fails, the intake valve and the exhaust valve is not opened and closed but is stuck in an opened state or a closed state. In particular, when a valve fixing pin supporting the intake valve and the exhaust valve to simultaneously close the intake valve and the exhaust valve is damaged, there is a problem in that any one of the intake valve and the exhaust valve may be closed and the other thereof may be stuck in the opened state.

If the CDA apparatus fails, the normal combustion is not made in a normal driving mode, and therefore a torque variation occurs at the broken cylinder and drivability is reduced, such that the CDA apparatus needs to be quickly repaired. To this end, there is a need to quickly inform a driver that a cause of the reduction in drivability occurs due to the failure of the CDA apparatus.

DISCLOSURE

Technical Problem

The present invention proposes to improve problems with the existing method for diagnosing sticking in a cylinder deactivation apparatus as described above, and an object of the present invention relates to a method for diagnosing sticking in a cylinder deactivation apparatus capable of diagnosing a failure of a cylinder deactivation apparatus by detecting a stuck open state and a stuck closed state of an intake valve and an exhaust valve.

Technical Solution

In accordance with one aspect of the present invention, a method for diagnosing sticking in a cylinder deactivation apparatus sensing a stuck closed state or a stuck open state of an intake valve and an exhaust valve due to a failure of a cylinder deactivation apparatus, includes: an intake valve sticking determining step of determining whether the intake valve is stuck closed or stuck open by detecting the amount of variation of intake pressure in each intake manifold cylinders in an operation-off mode of the cylinder deactivation apparatus and comparing the amount of variation with a predetermined value; and an exhaust valve sticking determining step of determining whether the exhaust valve is stuck closed or stuck open by detecting a state of the air-fuel ratio in exhaust gas if it is determined whether the intake valve is stuck closed or stuck open in the intake valve sticking determining step.

In the intake valve sticking determining step, when the detected variation of the intake pressure is larger than the predetermined value, it may be determined that the intake valve is stuck closed and when the detected variation of the intake pressure is smaller than the predetermined value, it may be determined that the intake valve is stuck open.

The predetermined value which is a comparison object of the variation of the intake pressure may have an upper bound threshold value and a lower bound threshold value and when the variation of the intake pressure is larger than the upper bound threshold value, it may be determined to be stuck closed and when the variation of the intake pressure is smaller than the lower bound threshold value, it may be determined to be stuck open.

In the exhaust valve sticking determining step, when the air-fuel ratio in the detected exhaust gas is lean, it may be determined that the exhaust valve is stuck open.

In the exhaust valve sticking determining step, when the detected air-fuel ratio in the exhaust gas is normal, a misfire of a cylinder may be sensed and when a misfire has occurred in a single cylinder, it may be determined that the exhaust valve is stuck closed.

In the exhaust valve sticking determining step, the misfire of the cylinder may be sensed based on an angular acceleration of a crank sensor.

In accordance with another aspect of the present invention, a method for diagnosing sticking in a cylinder deactivation apparatus sensing a stuck closed state or a stuck open state of an intake valve and an exhaust valve due to a failure of a cylinder deactivation apparatus includes: an intake valve sticking determining step of determining whether the intake valve is stuck closed or stuck open by detecting the whole intake pressure of an intake manifold in an operation-off mode of the cylinder deactivation apparatus and comparing the amount of variation with a predetermined value; and an exhaust valve sticking determining step of determining whether the exhaust valve is stuck closed or stuck open by detecting a state of the air-fuel ratio in exhaust gas if it is determined whether the intake valve is stuck closed or stuck open in the intake valve sticking determining step.

In accordance with still another aspect of the present invention, an apparatus for diagnosing sticking in a cylinder deactivation apparatus includes: an intake pressure detector configured to measure an intake pressure of an intake manifold; an oxygen sensor configured to measure an air quantity in exhaust gas; and a controller configured to detect the amount of variation of intake pressure in each intake manifold cylinder from the intake pressure detector in an operation-off mode of the cylinder deactivation apparatus and compare the detected amount of variation with a predetermined value to determine whether the intake valve is stuck closed and stuck open and calculate a state of an air-fuel ratio in the exhaust gas from the oxygen sensor to determine whether an exhaust valve is stuck open and stuck closed.

The controller may sense a misfire of a cylinder depending on a state of air-fuel ratio to determine whether the exhaust valve is stuck closed.

Advantageous Effects

As described above, according to the method for diagnosing sticking in a cylinder deactivation apparatus according to the present invention, the failure of the cylinder deactivation apparatus may be diagnosed by detecting the stuck open state and the stuck closed state of the intake valve and the exhaust valve and the cylinder deactivation apparatus may be quickly repaired by informing a driver of the failure of the deactivation apparatus while a vehicle is driven.

DESCRIPTION OF DRAWINGS

The above and other objects, features and other advantages of the present invention will be more clearly understood from the following detailed description taken in conjunction with the accompanying drawings, in which.

BEST MODE

Hereinafter, preferred embodiments of the present invention will be described in detail with reference to the accompanying drawings.

Figure 1:
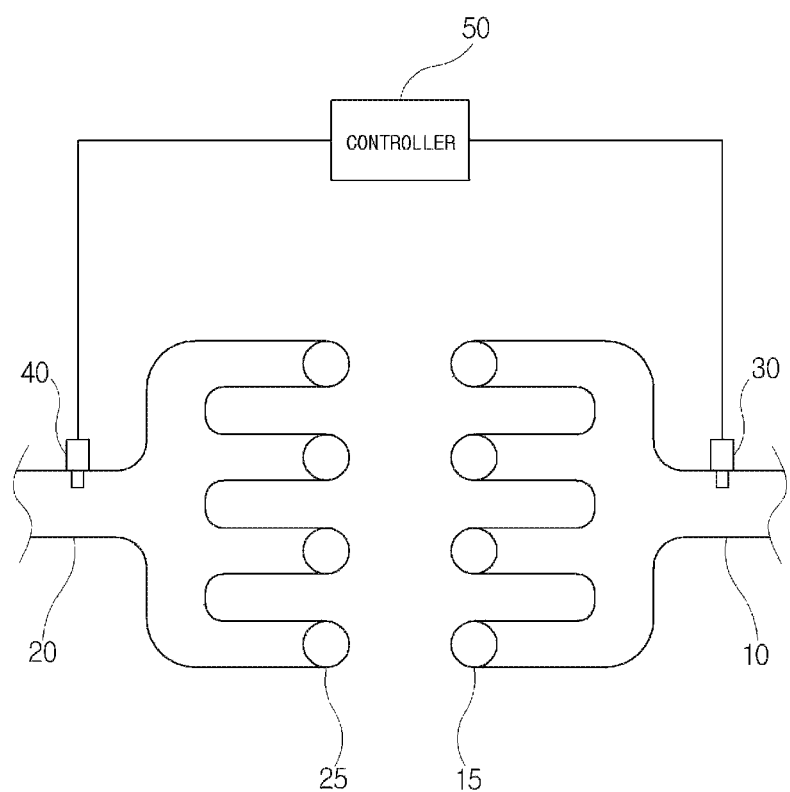
FIG. 1 is a schematic system diagram of a multi cylinder engine for describing a method for diagnosing sticking in a cylinder deactivation apparatus according to an exemplary embodiment of the present invention.

Referring to FIG. 1, an apparatus for diagnosing in a cylinder deactivation apparatus according to an exemplary embodiment of the present invention includes an intake pressure detector 30 configured to measure an intake pressure of an intake manifold 10, an oxygen sensor 40 configured to measure an air quantity in exhaust gas, and a controller 50 configured to detect the amount of variation of intake pressure in each cylinder of the intake manifold 10 from the intake pressure detector 30 and compare the detected amount of variation with a predetermined value and calculate a state of an air-fuel ratio in the exhaust gas from the oxygen sensor 40 to determine whether the exhaust valve is stuck open and stuck closed.

FIG. 1 illustrates 4 cylinders that is one bank of an 8 cylinder engine. Each of the cylinders is provided with intake valves 15 and exhaust valves 25, in which each of the intake valves 15 communicates with each other by the intake manifold 10 to suck air for combustion and each of the exhaust valves 25 communicates with each other by the exhaust manifold 20 to discharge the exhaust gas.

The intake manifold 10 is provided with an intake pressure detector 30 for measuring an intake pressure and the exhaust manifold 20 is provided with an oxygen sensor 40 for measuring an oxygen quantity in the exhaust gas to detect a lean condition or an enriched condition of the air-fuel ratio.

The intake pressure detector 30 may measure the intake pressures for each cylinder and a difference between the intake pressures and calculate an average value thereof to detect the whole intake pressure.

When the cylinder deactivation apparatus is in an operation-off mode, the controller 50 detects the amount of variation of the intake pressure in each cylinder of the intake manifold 10 from the intake pressure detector 30 and compares the detected amount of variation with the predetermined value. When the detected amount of variation of the intake pressure is larger than the predetermined value, it is determined that the intake valve is stuck closed and when the detected amount of variation is smaller than the predetermined value, it is determined that the intake valve is stuck open.

If the intake valve is closed, the intake pressure within the intake manifold 10 rises, and therefore if it is confirmed whether the intake pressure rises by measuring the intake pressure of the intake manifold 10, it may be appreciated that the intake valve is in the closed state.

Here, the controller 50 may calculate the overall intake pressure in which the average value of the intake pressures for each cylinder within the intake manifold 10 is summed to compare the calculated intake pressure with the predetermined value. Further, the predetermined value that is an object to be compared may be a specific experiment value and an atmospheric pressure. That is, the control unit 50 may compare the detected amount of variation of the intake pressure in each cylinder of the intake manifold 10 or the whole intake pressure with an atmospheric pressure or a specific threshold value obtained by the experiment.

The controller 50 determines whether the air-fuel ratio is lean or enriched based on the information on the air quantity measured by the oxygen sensor 40.

Air-fuel ratio=air quantity/fuel amount

Theoretical air quantity ratio is a ratio of air quantity:fuel (14.7:1)

$\lambda$=air quantity used in actual combustion/air quantity on theoretical air-fuel ratio.

If $\lambda=1\pm\varepsilon$ is a normal state, when $\lambda<1\pm\varepsilon$, the air quantity used in the actual combustion is smaller than the air quantity on the theoretical air-fuel ratio, and therefore the air-fuel ratio may be in an enriched state and when $\lambda>1\pm\varepsilon$, the air quantity used in the actual combustion is larger than the air quantity on the theoretical air-fuel ratio, and therefore the air-fuel ratio may be in a lean state. Here, $\varepsilon$ is a smaller value than 1, and therefore, when $\lambda$ is 1, a value in an allowable range as many as $\varepsilon$ is considered to be a normal state.

Meanwhile, the lambda value $\lambda$ is detected by the oxygen sensor 40, in which the oxygen sensor 40 does not measure the amount of fuel but measures a partial pressure of oxygen, and therefore, when normal ignition is not made, the air-fuel ratio of the exhaust gas discharged to the exhaust side is recognized as the lean state.

The control unit 50 determines whether the exhaust valve is stuck open or stuck closed depending on the state of the air-fuel ratio in the exhaust gas from the oxygen sensor 40.

The case in which $\lambda>1\pm\varepsilon$, that is, the case in which the air-fuel ratio is lean means that the air quantity used in the actual combustion is smaller than the air quantity on the theoretical air-fuel ratio. The reason is that the exhaust valve is open and thus non-combustion exhaust gas of the cylinder chamber is introduced into the exhaust manifold 20. Therefore, it may be determined that the exhaust valve is in the stuck open state.

When λ=1±ε, that is, when the air-fuel ratio is a normal state, the controller 50 uses an angular acceleration of a crank sensor to sense a misfire of a cylinder and when a misfire has occurred in a single cylinder, it is determined that the exhaust valve is in the struck closed state.

Figure 2:
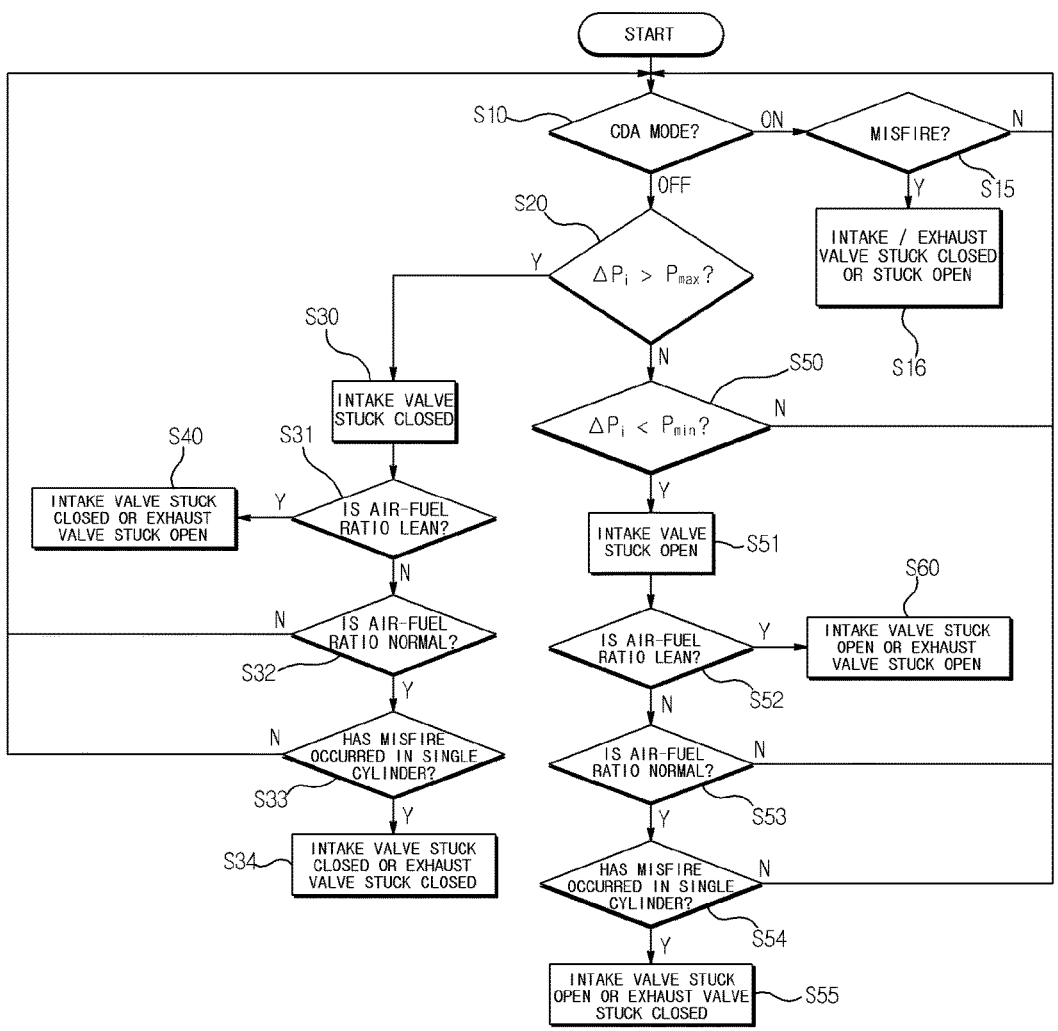
FIG. 2 is a flow chart illustrating the method for diagnosing sticking in a cylinder deactivation apparatus according to the exemplary embodiment of the present invention.
Figure 3:
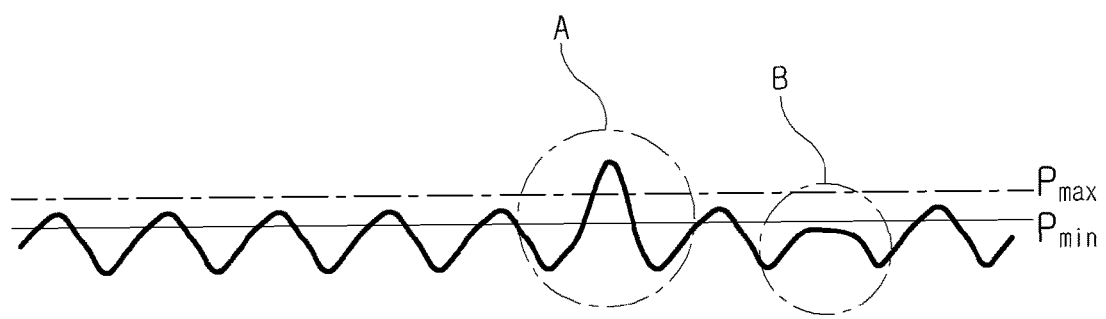
FIG. 3 is a graph illustrating an intake pressure difference for explaining an intake valve sticking determining step illustrated in FIG. 2.

Hereinafter, a process of diagnosing stuck open or stuck closed of an intake valve and an exhaust valve will be described in detail with reference to FIGS. 1 to 3.

This is based on the fact that the amount of variation of the intake pressure in each intake manifold cylinder is measured in the operation-off mode of the cylinder deactivation apparatus and the state of the air-fuel ratio in the exhaust gas is determined. Since the engine is in a normal driving mode in the operation off mode, fuel is normally injected even to the stuck cylinder.

Further, a gasoline direct injection (GDI) engine directly injecting fuel into the combustion chamber is premised. In the case of the gasoline direct injection, fuel is directly injected into the combustion chamber, and therefore when the exhaust valve is open even in the state in which the intake valve is closed, the injected fuel is discharged to the exhaust manifold as it is to affect the air-fuel ratio.

First, it is checked that a CDA mode is in an off state or an on state (S10). In the case of the off state, a difference $\Delta P_i$ in the intake pressure in each cylinder of the intake manifold is detected to compare with a predetermined value $P_{max}$ or $P_{min}$. When the difference in the intake pressure measured in each 1 segment occurs, it may be predicted that abnormality occurs in the intake valve, which compares with the predetermined value $P_{max}$ or $P_{min}$ obtained by the experiment. As illustrated in FIG. 3, the $P_{max}$ is an upper bound threshold value and the $P_{min}$ is a lower bound threshold value. In the normal state, the intake valve is open only in an intake stroke of each cylinder. FIG. 3 illustrates that in the case of the multi cylinder, some of the plurality of intake valves are open in the intake stroke and then the intake pressure is vibrated depending on the opening and closing of the intake valve while an operation of closing all the intake valves is repeatedly performed when the intake stroke ends. Therefore, when the difference $\Delta P_i$ of the intake pressure in each cylinder is in a range between the upper bound threshold value $P_{max}$ and the lower bound threshold value $P_{min}$, the cylinder deactivation apparatus is in a normal state and when the difference $\Delta P_i$ is out of the range therebetween, the cylinder deactivation apparatus may be determined to be failure.

That is, when the difference $\Delta P_i$ of the intake pressure in each cylinder is larger than the upper bound threshold value $P_{max}$ (A of FIG. 3), it is determined that the intake valve is stuck closed (S30). In the step S30, if it is determined that the intake valve is stuck closed, the state of the air-fuel ratio in the exhaust gas is detected (S31 and S32) and if it is determined that the air-fuel ratio is lean, it is determined that the exhaust valve is stuck open (S40).

If the exhaust valve is stuck open, the normal ignition is not made and when the air and fuel that are not normally ignited are discharged to the exhaust side, the air-fuel ratio is in the lean state.

When the air-fuel ratio is normal, the misfire of the cylinder is sensed (S33) and when the misfire has occurred in the single cylinder, it is determined that the exhaust valve is stuck closed (S34).

When the exhaust valve is stuck closed, the non-combusted gas is generated. In this case, the exhaust valve is in a closed state, and therefore is not discharged to the exhaust side. For example, when one valve is stuck closed, a 4 cylinder engine is operated as a 3 cylinder engine. In this case, the air-fuel ratio detected by the oxygen sensor is normal. As a result, it may not be determined whether the exhaust valve is stuck closed based on only the air-fuel ratio, and therefore it is determined whether the exhaust valve is stuck closed by additionally sensing whether a misfire has occurred in a specific cylinder. If the ignition is made when the exhaust valve is closed, since the incomplete combustion, that is, the misfire occurs, it may be determined whether the exhaust valve is stuck closed.

When the difference $\Delta P_i$ of the intake pressure in each cylinder is smaller than the upper bound threshold value $P_{max}$ (B of FIG. 3), the difference $\Delta P_i$ again compares with the lower bound threshold value $P_{min}$ (S50). As a result, when the difference $\Delta P_i$ of the intake pressure in each cylinder is smaller than the lower bound threshold value $P_{min}$, it is determined that the intake valve is stuck open (S51).

If it is determined that the intake valve is stuck open since the difference $\Delta P_i$ of the intake pressure in each cylinder is smaller than the lower bound threshold value $P_{min}$, the state of the air-fuel ratio in the exhaust gas is detected (S52 and S53).

As a result, when the air-fuel ratio is lean, it is determined that the exhaust valve is stuck open (S60) and when the air-fuel ratio is normal, similar to the step S33, the misfire of the cylinder is sensed (S54). When the misfire has occurred in the single cylinder, it is determined that the exhaust valve is stuck closed (S55). This is the same reason as the step S34.

Meanwhile, when the CDA mode in an on state, it is confirmed whether the misfire occurs (S15) to detect the stuck state of the intake valve and the exhaust valve. When the CDA mode is in an on state, it is normal that the set intake valve and exhaust valve are closed and the fuel injection stops. However, when both of the intake valve and the exhaust valve are stuck open due to the failure of the CDA apparatus, the misfire occurs. Therefore, it is checked whether the misfire occurs (S15). Here, when the misfire occurs, it is determined that both of the intake valve and the exhaust valve are stuck open (S16).

Although the preferred embodiments of the present invention have been disclosed for illustrative purposes, they are for specifically explaining the present invention. Therefore, the exemplary embodiments of the present invention is not limited thereto, but those skilled in the art will appreciate that various modifications and alteration are possible, without departing from the scope and spirit of the invention as disclosed in the accompanying claims.

Accordingly, any and all modifications, variations or equivalent arrangements should be considered to be within the scope of the invention, and the detailed scope of the invention will be disclosed by the accompanying claims.

The invention claimed is:
1. A method for diagnosing sticking in a cylinder deactivation apparatus sensing a stuck closed state or a stuck open state of an intake valve and an exhaust valve due to a failure of a cylinder deactivation apparatus, the method comprising:
   determining that the intake valve is stuck closed or stuck open by detecting an amount of variation of intake pressure in each intake manifold cylinder in an operation-off mode of the cylinder deactivation apparatus and comparing the amount of variation with a prede- termined range of values, the determining that the intake valve is stuck closed or stuck open comprising:
    based on the detected variation of the intake pressure being larger than the predetermined range of values, determining that the intake valve is stuck closed, and
    based on the detected variation of the intake pressure being smaller than the predetermined range of values, determining that the intake valve is stuck open; and
determining whether the exhaust valve is stuck closed or stuck open by detecting a state of the air-fuel ratio in exhaust gas based on determining that the intake valve is stuck closed or stuck open.

2. The method of claim 1, wherein the cylinder deactivation apparatus is in a vehicle, the method further comprising, while the vehicle is driven, informing a driver of a reduction in drivability due to the failure of the cylinder deactivation apparatus based on the determined stuck open or stuck closed intake valve or exhaust valve.

3. The method of claim 1, wherein the predetermined range of values, which is a comparison object of the amount of variation of the intake pressure, has an upper bound threshold value and a lower bound threshold value, and wherein the method comprises:
    based on the amount of variation of the intake pressure being larger than the upper bound threshold value, determining the intake valve to be stuck closed, and
    based on the amount of variation of the intake pressure being smaller than the lower bound threshold value, determining the intake valve to be stuck open.

4. The method of claim 1, wherein the determining whether the exhaust valve is stuck closed or stuck open comprises, based on the air-fuel ratio in the detected exhaust gas being lean, determining that the exhaust valve is stuck open.

5. The method of claim 1, wherein the determining whether the exhaust valve is stuck closed or stuck open comprises, based on the detected air-fuel ratio in the exhaust gas being normal, sensing a misfire of a cylinder; and
    based on sensing a misfire in a single cylinder, determining that the exhaust valve is stuck closed.

6. The method of claim 5, wherein in the determining whether the exhaust valve is stuck closed, the misfire of the cylinder is sensed based on an angular acceleration of a crank sensor.

7. An apparatus for diagnosing sticking in a cylinder deactivation apparatus in an operation-off mode, comprising:
    an intake pressure detector configured to measure an intake pressure of an intake manifold;
    an oxygen sensor configured to measure an air quantity in exhaust gas; and
    a controller configured to detect the amount of variation of intake pressure in each intake manifold cylinder from the intake pressure detector and compare the detected amount of variation with a predetermined range of values to determine whether the intake valve is stuck closed or stuck open, and to calculate a state of an air-fuel ratio in the exhaust gas from the oxygen sensor to determine whether an exhaust valve is stuck open or stuck closed,
    wherein the controller senses a misfire of a cylinder depending on a state of air-fuel ratio to determine whether the exhaust valve is stuck closed.

8. The apparatus of claim 7, wherein a driver of a vehicle is informed, while the vehicle is driven, of a reduction in drivability due to the failure of the cylinder deactivation apparatus based on the determined stuck open or stuck closed intake valve or exhaust valve.

* * * * *